US006002850A

United States Patent [19]
Sumino et al.

[11] Patent Number: 6,002,850
[45] Date of Patent: Dec. 14, 1999

[54] OPERATION SEQUENCE USER ADAPTIVE SYSTEM AND METHOD

[75] Inventors: Shigeo Sumino, Chofu; Takafumi Miyatake, Hachioji; Hirotada Ueda, Kokubunji, all of Japan

[73] Assignee: New Media Development Association, Tokyo, Japan

[21] Appl. No.: 08/091,004

[22] Filed: Jul. 13, 1993

[30] Foreign Application Priority Data

Jul. 15, 1992  [JP]  Japan ..................................... 4-187897

[51] Int. Cl.$^6$ ....................................................... G06F 9/44
[52] U.S. Cl. ............................................. 395/161; 395/159
[58] Field of Search .................................. 395/155, 156, 395/159, 161, 157, 700, 650, 375

[56] References Cited

U.S. PATENT DOCUMENTS

| | | | |
|---|---|---|---|
| 5,257,363 | 10/1993 | Shapiro et al. | 395/500 |
| 5,283,896 | 2/1994 | Temmyo et al. | 395/650 |
| 5,367,626 | 11/1994 | Morioka et al. | 395/159 |

FOREIGN PATENT DOCUMENTS

| | | |
|---|---|---|
| 0 401 975 A3 | 12/1990 | European Pat. Off. . |
| 0 407 296 A1 | 1/1991 | European Pat. Off. . |
| 58-39334 | 1/1978 | Japan . |
| 55-146539 | 11/1980 | Japan . |
| 1-318166 | 12/1989 | Japan . |
| 2019964 | 1/1990 | Japan . |

OTHER PUBLICATIONS

Baldassari et al., "PROTOB: an Object–Oriented Case Tool for Modelling and Prototyping Distributed Systems," Software Practice & Experience, vol. 21, No. 8, Aug. 1991, pp. 823–844.

Reaching Through Technology (Human Factors in Computing Systems), "Eager: Programming Repetitive Tasks by Example", Allen Cypher, CHI '91 Conference Proceedings, ACM Press.

*Primary Examiner*—Kee M. Tung
*Assistant Examiner*—Crescelle N. dela Torre
*Attorney, Agent, or Firm*—Antonelli, Terry, Stout & Kraus, LLP

[57] ABSTRACT

An operation sequence user adaptive system for use in a processing system. The system including a central processing unit in which after objects displayed on a display screen of a display are specified from a mouse or a keyboard, and when a function to be effected for the objects are specified through selection of a function selective menu, a pertinent function of an application program is executed. The adaptive system includes a function of storing a data structure for storing therein a usage frequency of each of the functions, an update function of monitoring an operation conducted by the user for each function and updating a weight between particular functions successively operated, and a combining function of combining, when the weight updated by the update function exceeds a predetermined threshold value, the particular functions associated with the weight.

11 Claims, 15 Drawing Sheets

CURRENT TRANSITION

|  | tab | tbb | tbc | tce | tbe | tea | tee | tad | tNew |
|---|---|---|---|---|---|---|---|---|---|
| 320 tab | X | S1 341 | S2 342 | X | S3 343 | X | X | X | X |
| 321 tbb | X | S4 344 | S5 345 | X | S6 346 | X | X | X | X |
| 322 tbc | X | X | X | S7 347 | X | X | X | X | X |
| 323 tce | X | X | X | X | X | S8 348 | S9 349 | X | X |
| 324 tbe | X | X | X | X | X | S10 350 | S11 351 | X | X |
| 325 tea | S12 352 | X | X | X | X | X | X | S13 353 | S20 360 |
| 326 tee | X | X | X | X | X | S14 354 | S15 355 | X | X |
| 327 tad | X | X | X | X | X | S16 356 | S17 357 | X | X |
| 328 tNew | X | X | X | X | X | S21 361 | S22 362 | X | X |

| count | 5 | ~341a |
|---|---|---|
| weight | 0.25 | ~341b |
| pre_func | (B)1,1 | ~341c |
| next_func | (B)1,1 | ~341d |

S2 342

| count | 5 | ~342a |
|---|---|---|
| weight | 0.25 | ~342b |
| pre_func | (B)1,1 | ~342c |
| next_func | (C)n,n | ~342d |

S3 343

| count | 10 | ~343a |
|---|---|---|
| weight | 0.5 | ~343b |
| pre_func | (B)1,1 | ~343c |
| next_func | (E)1,1 | ~343d |

S13 353

| count | 6 | ~353a |
|---|---|---|
| weight | 0.2 | ~353b |
| pre_func | (A)1,1 | ~353c |
| next_func | ((D)2,1·(E)1,1)2,1 | ~353d |

S20 360

| count | 0 | ~360a |
|---|---|---|
| weight | 0.0 | ~360b |
| pre_func | (A)1,1 | ~360c |
| next_func | ((B)1,1·(E)1,1)1,1 | ~360d |

S21 361

| count | 0 | ~361a |
|---|---|---|
| weight | 0.0 | ~361b |
| pre_func | ((B)1,1·(E)1,1)1,1 | ~361c |
| next_func | (A)1,1 | ~361d |

S22 362

| count | 0 | ~362a |
|---|---|---|
| weight | 0.0 | ~362b |
| pre_func | ((B)1,1·(E)1,1)1,1 | ~362c |
| next_func | (E)1,1 | ~362d |

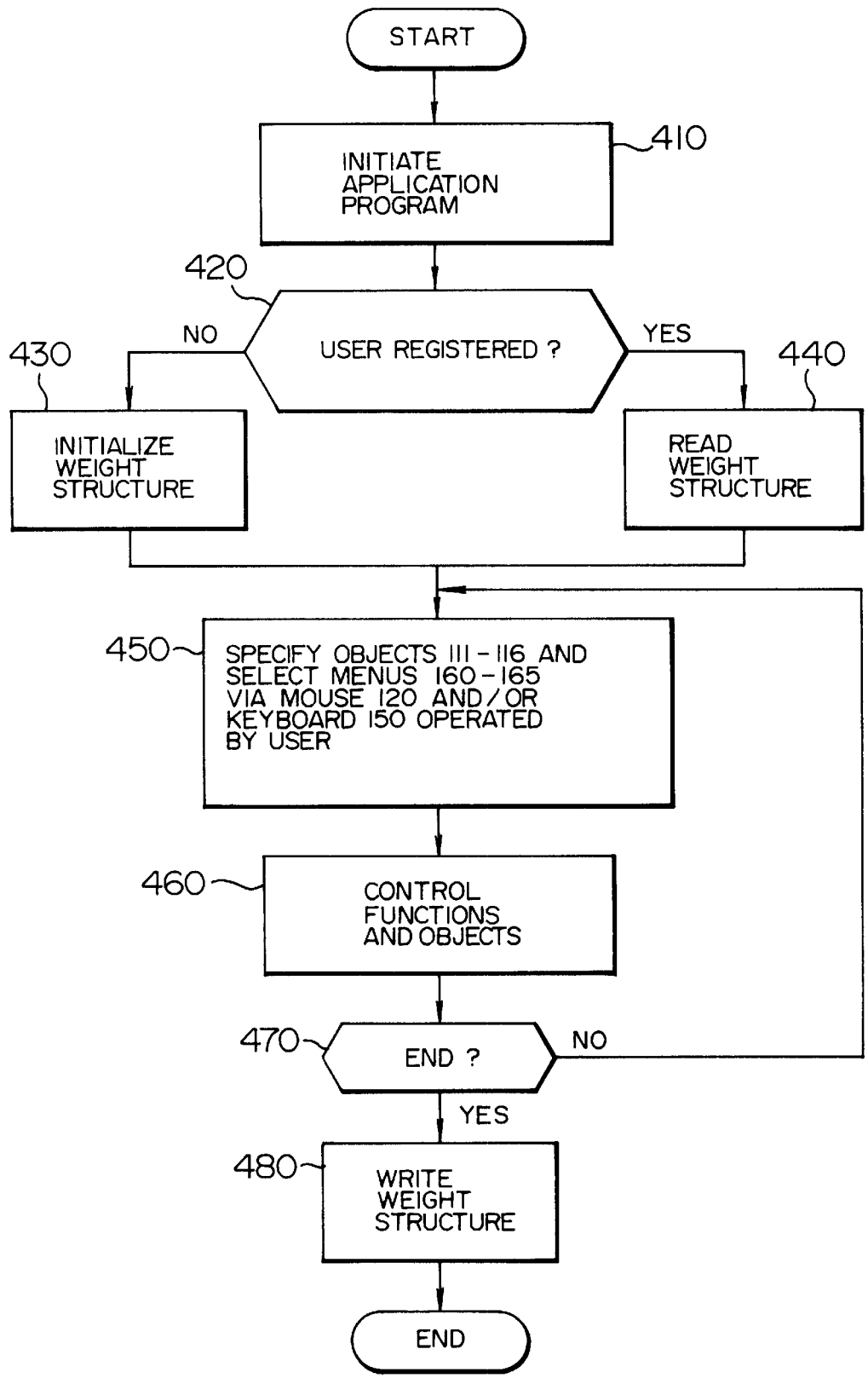

OPERATION SEQUENCE USER ADAPTIVE SYSTEM AND METHOD

BACKGROUND OF THE INVENTION

The present invention is related to a technology in which usability or operability of a computer system for the user to operate functions of an application program in the system is improved by recognizing on the system side an operation purpose of the user, and in particular, to an operation sequence user adaptive system and an operation sequence user adaptive method in which from operation sequences conducted by the user according to a command system supported by the system, there are extracted a sequence of function series meaningful for the user, thereby producing a new command adapted to preference of the user.

To adapt a computer system to preference of a user, there has been commonly used a method of altering various setting files such as login. and .cshrc files of UNIX. However, the operation to modify, namely, to customize such setting files requires knowledge and human power to a considerable extent and hence cannot be achieved by the user who is not knowledgeable in the field. To facilitate operations of a computer system, there has been increasingly required a computer interface which varies according to preference of the user. According to the interface, namely, the computer automatically feels or detects preference of the user to adapt itself thereto.

As an example of such a user adaptation, there has been an operation to re-arrange candidate character strings in a kana-kanji (Japanese syllabary letters—Chinese characters) conversion software. According to a kanji term input apparatus described in the JP-B-57-32366, the re-arrangement is achieved depending on frequency of uses of characters. In a Japanese sentence input apparatus described in the JP-B-58-39334, the operation is carried out according to last used terms. Although the ideas above are quite suggestive, it is impossible to directly apply them to various kinds of interface.

Furthermore, in an information processing apparatus described in the JP-A-1-318166, information necessary to set a picture quality is inputted depending on a state of each user, thereby setting a picture quality according to preference of the user.

In "EAGER: Programming Repetitive Tasks by Example" described in pages 33 to 39 of the Proc. of CHI '91, Conf. on Human Factors in Computing Systems, ACM, there has been proposed an experimental system operating in accordance with HyperCard on Macintosh computers. In this system, however, a Copy-and-Paste operation to extract data items of a certain attribute from a database prepared on a stack of HyperCard to generate a list thereof is automatically detected only to combine a sequence of functions of the operation. Namely, the combination is achieved only for a function sequence formed in a loop. A sequence of functions is configured in a loop only when the function sequence accomplishes a simple operation. As a result, EAGER cannot be utilized for the adaptation of the system to the user in a case of a complex operation, namely, where various kinds of functions are used to operate objects.

As above, to enhance the system adaptation to the user which has been insufficient in the prior art, it is required to discuss the adaptation from standpoints of system designers and users so as to recognize actual problems to be solved.

Ordinarily, when creating a system, the system designer assumes an operation procedure of the user in the system, thereby supplying the prepared system to the user. On the other hand, the user of the system estimates an operation procedure thereof irrespective of the idea of the system designer to operate the system according to an image occurring to his or her mind.

Consequently, there often exists a gap between the operation procedure supplied by the designer and that imagined by the user. For example, a phenomenon of "techno-stress" recently attracting attentions in which the user of a system is frustrated because the system does not operate according to his or her intention is possibly caused by the existence of such a gap between the operation procedures above.

SUMMARY OF THE INVENTION

It is therefore an object of the present invention to improve usability of a system in which the user feels inconvenience in use thereof due to a gap between an operation procedure prepared by the system designer and that presumed by the user. The system extracts, from a sequence of operations achieved by the user according to a command system supported by the system, a sequence of function series meaningful for the user, namely, having a high frequency of utilization and then abbreviates the obtained sequence into a combined form, thereby improving the usability.

In order to achieve the object above, in a user adaptive method and a user adaptive system according to the present invention, there are disposed means for storing therein a function being currently activated in an application program at a token, a state from an activation of a function in a place to an activation of a subsequent function, an activating condition to determine whether or not a combination of an object specified for a transition by the user and a selected function is executable, an execution order of functions in a direction of arc, and a Petri net in which a usage frequency of function sequence is assigned to a weight (assigned to two transitions successively fired); and means for monitoring an operation of the user and updating a pertinent weight, means operative when the weight exceeds a preset threshold value for copying a place to which an objective function is assigned, generating arcs and transitions to establish connections therebetween, and combining a sequence of functions associated therewith into combined form.

Moreover, in the user adaptive method and the user adaptive system above, when a sequence of functions is combined a selective menu corresponding thereto is added to an existing list of selective menu of functions.

In addition, in the user adaptive method and the user adaptive system above, in association with the compressed sequence of functions, a face of the selective menu to be added is displayed, the face including portions of the existing list of selective menus of functions.

Furthermore, in the user adaptive method and the user adaptive system above, there is disposed a regular expression capable of describing in a unified manner a case where an identical function is consecutively activated and a case where a plurality of functions are sequentially activated.

Moreover, in the user adaptive method and the user adaptive system above, there is disposed means for storing therein history including a combination of a function activated and objects having acted thereon such that an objective weight is updated only when a function previously activated is equal to that currently being active and the number of objects previously acted upon by the function is identical to that of objects currently acted upon by the current function or only when a function previously activated is different from that currently being active and the objects previously acted upon and those currently being acted upon are respectively inputs and outputs of the function previously activated.

According to the present invention, there are disposed models including a function being currently activated in an application program at a token, a state from an activation of a function in a place to an activation of a subsequent function, an activation condition to determine whether or not a combination of an object specified for a transition by the user and a selected function is executable, an execution order of functions in a direction of arc, and a Petri net in which a usage frequency of function sequence is assigned to a weight (assigned to two transitions successively fired) such that the system monitors an operation of the user to update a pertinent weight. When the weight exceeds a preset threshold value, the system copies a place to which an objective function is assigned and generates arcs and transitions to establish connections therebetween, thereby combining a sequence of functions associated therewith into a combined form. As a result, it is possible to extract, from a sequence of operations achieved by the user according to a command system supported by the system, a sequence of function series meaningful for the user, thereby generating a new combined function thus favorably combined in association with the function sequence.

Moreover, when a sequence of functions is combined, a selective menu corresponding thereto is added to an existing list of selective menu of functions so as to support the function unique to the user.

In addition, in the user adaptive method and the user adaptive system above, in association with the combined sequence of functions, a face of the selective menu to be added is displayed, the face including portions of the existing list of selective menus of functions. This enables the user to visually recognize significance of the selective menu thus added.

Furthermore, in the user adaptive method and the user adaptive system above, there is disposed a regular expression capable of describing in a unified manner a case where an identical function is consecutively activated and a case where a plurality of functions are sequentially activated, thereby helping the user initiate the functions in an arbitrary sequence.

Moreover, there is disposed means for storing therein history including a combination of a function activated and objects to be acted upon such that an objective weight is updated only when a function previously activated is equal to that currently being active and the number of objects previously acted upon is identical to that currently being acted upon or only when a function previously activated is different from that currently being activated and the objects previously acted upon and those currently being acted upon are respectively inputs and outputs of the function previously activated. Resultantly, it is possible to extract a sequence of functions in which an operation purpose of the user is reflected.

BRIEF DESCRIPTION OF THE DRAWINGS

These and other objects and advantages of the present invention will become apparent by reference to the following description and accompanying drawings wherein:

FIGS. 3A to 3C are diagrams for explaining a data structure to control functions and a weight structure to keep therein utilization frequencies of sequences of functions according to the present invention;

FIG. 4 is a flowchart showing a processing procedure in an embodiment according to the present invention;

DESCRIPTION OF THE PREFERRED EMBODIMENTS

Next, description will be given in detail of an embodiment according to the present invention.

Figure 1:
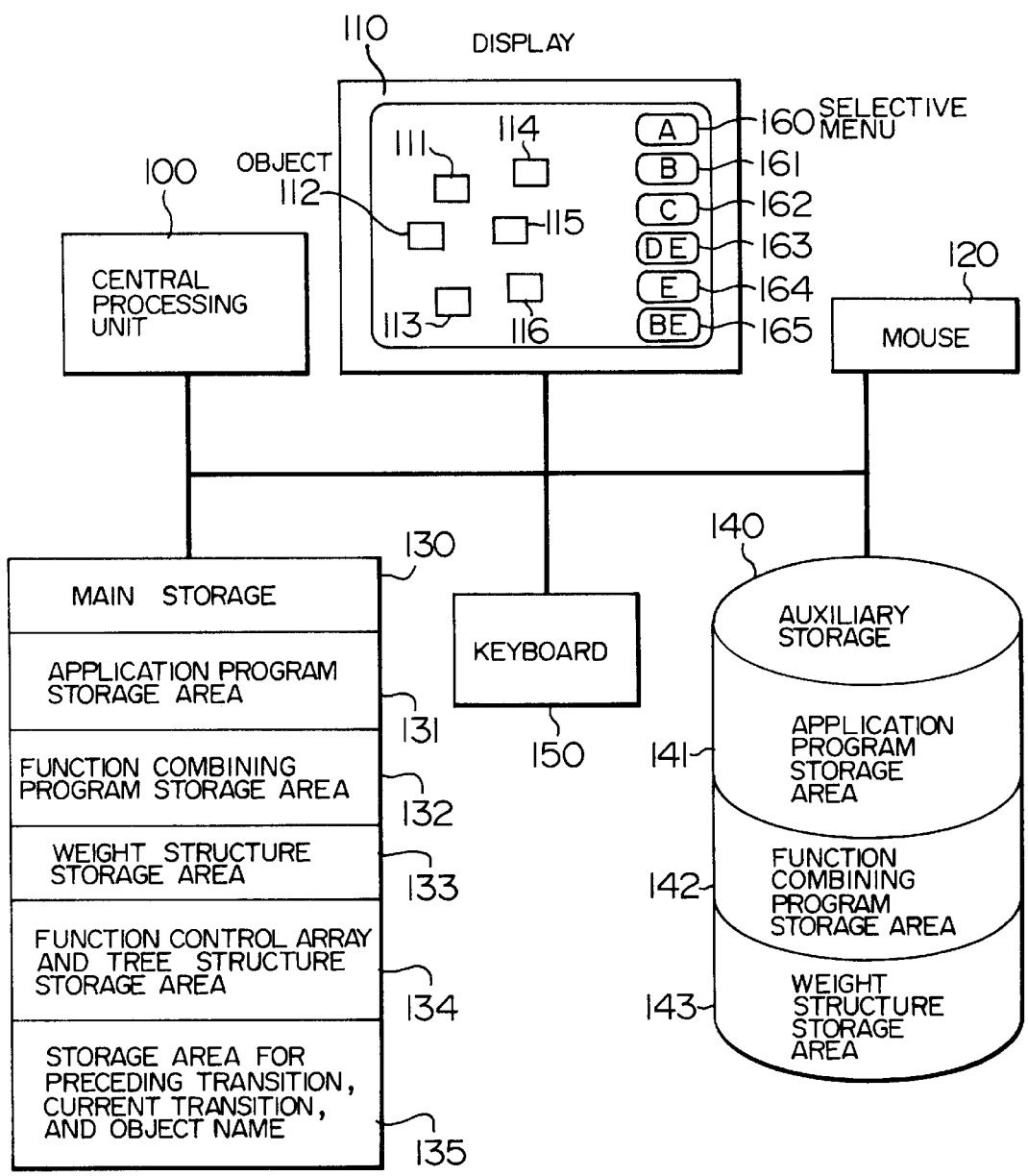
FIG. 1 is a block diagram schematically showing the machine configuration to implement a user adaptive system and a user adaptive method according to the present invention.

FIG. 1 shows in a block diagram showing the machine construction in which a user adaptive system and a user adaptive method are implemented according to the present invention.

The system of FIG. 1 includes a central processing unit (CPU) 100, a display 110 for displaying thereon function selective menus 160 to 165 and objects 111 to 116 for which the functions are executed, a mouse 120 as a pointing device for specifying a function selective menu and an object presented on the display 110, a main storage 130, an auxiliary storage 140 for storing therein processing programs and data related to the present invention, and a keyboard 150 for specifying a function selective menu and an object presented on the display 110 and for inputting characters and letters.

The main storage 130 includes an application program storage area 131 for storing therein application programs used by the user, a function combining program storage area 132 for storing therein a program to extract and to combine a sequence of functions frequently used by the user in accordance with the present invention, a weight structure storage area 133 for storing therein utilization frequencies of sequences of functions according to the present invention, a function control array and tree structure storage area 134 for storing therein data structures to control execution sequences of functions according to the present invention, and a storage area 135 for storing therein a preceding transition identifier, a current transition identifier, and object names. The auxiliary storage 140 includes an application program storage area 141 for storing therein application programs employed by the user, a function combining program storage area 142 for storing therein a program to extract and to combine a sequence of functions frequently used by the user in accordance with the present invention, a weight structure storage area 143 for storing therein utilization frequencies of sequences of functions according to the present invention.

In the configuration, according to the user adaptive system and the user adaptive method of the embodiment, the CPU 100 analyzes by the function combining program of the present invention loaded from the area 142 into the area 132 a sequence of operations conducted by the user according to an existing application program loaded from the area 141 into the area 131. Namely, an analysis is made to determine a sequence of activation of functions for objects associated therewith, the functions and objects respectively being specified by the user via the mouse 120 or the keyboard for the menus 160 to 164 and the objects 111 to 116 presented on the display. The CPU 100 thereby extracts and combines a sequence of function series significant to the user to generate a combined command and then adds a selective menu 165 corresponding to the command to the menus 160 to 164 displayed on the display 110, thereby presenting all selective menus 160 to 165 thereon.

With the provision in which the system extracts a sequence of function series meaningful for the user from a sequence of operations achieved by the user according to functions supported by the application program so as to create a new combined function associated therewith, there can be improved usability of a system in which the user feels inconvenience of operations due to a gap between an operation procedure prepared by the system designer and that assumed by the user.

Figure 2:
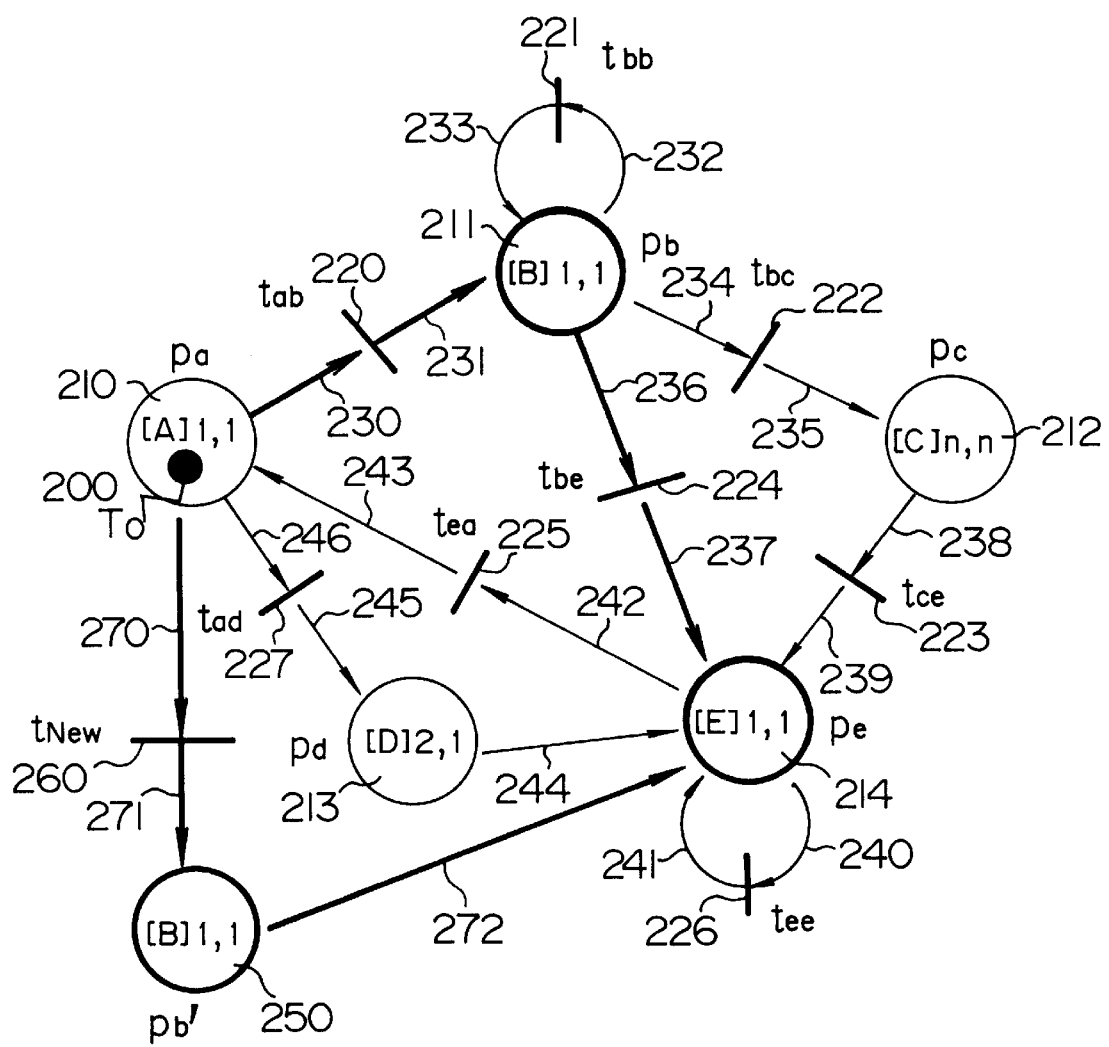
FIG. 2 is a conceptual diagram of a weighted Petri net to materialize the user adaptive system and the user adaptive method according to the present invention.

FIG. 2 conceptually shows a weighted Petri net to implement a user adaptive system and a user adaptive method according to the present invention.

In the diagram, a reference numeral 200 indicates a token T0 in the Petri net. The token T0 designates a function A currently active in the application program. Numerals 210 to 214 and a numeral 250 respectively stand for places pa, pb, pc, pd, pe, and pb'. These places respectively designate states from activation respectively of a 1-input 1-output function A, a 1-input 1-output function B, an n-input n-output function C, a 2-input 1-output function D, 1-input 1-output function E, and a 1-input 1-output function B' to activation of subsequent functions respectively associated therewith. Numerals 220 to 227 and a numeral 260 respectively denote transitions tab, tbb, tbc, tce, tbe, tea, tee, tad, and tNew, which respectively indicate activating conditions to determine whether or not combinations of objects 111 to 116 specified on the display 110 by the user and the selective menus 160 to 165 of the selected functions are executable. When the combinations are executable, fire of transition takes place to move the token T0 200 to a place such that a function associated with the place is activated. The number of objects to be designated is also included in the specification. Consequently, even in a case where an identical function is selected, when the number of objects to be specified varies, fire occurs for another transition. Numerals 230 to 246 and 270 to 272 stand for arcs to denote execution sequence of functions respectively according to orientation or direction thereof.

In a case where the token T0 200 representing the present state exists in the place pa 210, namely, where the function corresponding to the place pa 210 is completely activated, when the user specifies the object 111 and then selects the selective menu 162 of the function B to be executed for the object 111, there is fired the transition 220 associated with a combination of the object 111 and the function B. As a result of fire, the token T0 200 moves from the place pa 210 to the place pb 211. Using as an input thereto the object 111 specified at the fire of the transition tab 220, the function B is activated in association with the place pb 211. After the function B is terminated, if either one of the next firable transitions tbb 221, tbc 222, and tbe 224 is fired or if the arc connected to the place pb 211 is linked with another place due to absence of transition, the token T0 200 is kept remained in the place pb 211.

In this net, unlike in an ordinary Petri net, a transition does not necessarily exist for an arc establishing connection between places. When the arc is missing, the token moves from a place to another place without fire of transition. For example, in a case where the token T0 200 exists in the place pa 210, when the transition tad 227 fires, the token T0 200 moves to the place pd 213 and then to the place pe 214 in a sequential fashion. This is associated with a sequential activation of the functions D and E assigned to the places through which the token has traveled.

As above, there are assigned a function currently active in the application program at a token in the weighted Petri net, a state from an activation of a function in a place to an activation of a subsequent function, and an activating condition to determine whether or not combinations of objects specified for the transition and the selected functions are executable. Moreover, a usage frequency of a sequence of functions is assigned to a weight (assigned to two transitions to be consecutively fired), thereby monitoring sequences and frequencies of activation of functions for objects associated therewith in the application program. Checking weights of transitions, the system can extract a sequence of function series significant to the user. When the weight exceeds a preset threshold value, a sequence of places associated with the weight is copied so as to generate arcs and transitions to establish connections therebetween.

For example, in a case where the weight assigned to the transitions tab 220 and tbe 224 exceeds a predetermined threshold value, when the user operates the objects 111 to 116 and the function selective menus 162 and 164 on the display, the pertinent place pb 211 is copied as the place pb' 250 and then the transition tNew 260 and the arcs 270 to 272 are created to establish connections therebetween. Generation of the transition tNew 260 appears on the display 110 as addition of the selective menu 165 of a function to consecutively activate the functions B and E.

When a sequence of functions is thus combined, a selection item associated therewith is added to the existing function selective menus, which enables the user to operate a sequence of function series unique to the user and which thereby improves usability.

Figures 3A, 3B:
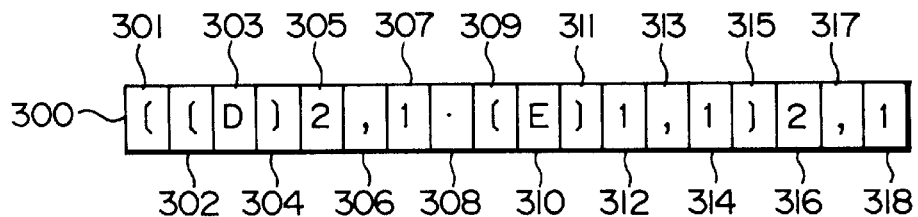

FIGS. 3A to 3C are diagrams for explaining a data structure to control functions and a weight structure for keeping therein utilization frequencies of function sequences according to the present invention.

In FIG. 3A, a numeral 300 denotes a function control array to control functions in an application program. The array 300 includes areas for storing therein symbols to control the respective functions. Although 18 storage areas are shown this embodiment, the array configuration is not restricted by the embodiment.

Symbols "[" 302, "D" 303, "]" 304, "2" 305, "," 306, and "1" 307 designate that the function D has two inputs and one output. Symbols "[" 309, "E" 310, "]" 311, "1" 312, "," 313, and "1" 314 denote that the function E has one input and one output. A symbol "." 308 is used together with symbols "[" 301 and "]" 315 associated with the symbol "." 308. Moreover, the symbol "." is employed together with the symbols "2" 316, "," 317, and "1" 318 denoting the numbers respectively of inputs and outputs to indicate that the functions thus parenthesized, namely, the 2-input 1-output function D and the 1-input 1-output function E are to be sequentially executed and the operation is conducted as a 2-input 1-output operation.

Furthermore, when a sequence of symbols enclosed by the symbols "[" and "." is identical to a sequence of symbols enclosed by the symbols "." and "]", a plus symbol "+" is described immediately after the first symbol sequence. For example, for a sequence of symbols "[[XXX]n,n•[XXX]n, n]n,n", the user describes "[[XXX]n,n+]n,n".

Figure 9:
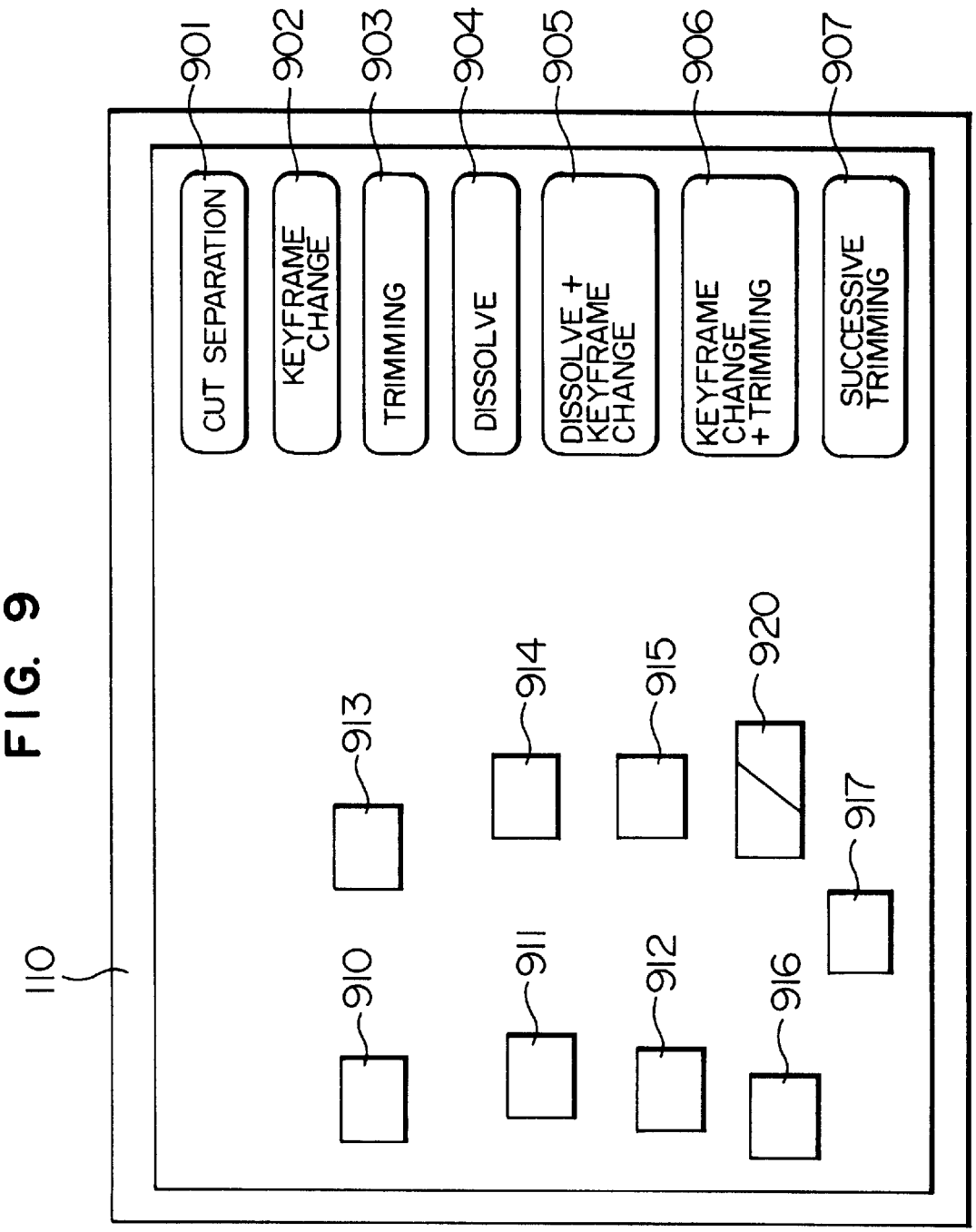
FIG. 9 is a diagram showing an example of a display screen in an embodiment in which the user adaptive system and the user adaptive method are applied to a motion picture editing operation according to the present invention.

In this regard, a 1-input 1-output function indicates a function in which, for example, like in the embodiments of FIG. 9 and subsequent diagrams, a cut is inputted and is trimmed, i.e., the in and out points of the cut are changed, thereby producing a result thereof. Moreover, in a 2-input 1-output function, two cuts are inputted and then the cuts are subjected to a "dissolve" operation so as to output a cut as a result. Furthermore, in an n-input n-output function, processing such as the trimming is sequentially achieved for a plurality of cuts in a repetitious manner.

Referring now to FIGS. 7A to 7E and FIG. 8, detailed description will be given of an algorithm to interpret the function control array 300.

In FIG. 3B, numerals 320 to 328 and 330 to 338 respectively stand for transitions consecutively fired in FIG. 2. Specifically, the numerals 320 to 328 denote the transitions fired before the transitions 330 to 338, respectively. In each pair, the transition first fired is called a before or preceding transition; whereas, the transition fired next is called an after transition or a succeeding transition. Numerals 341 to 357 and 360 to 362 respectively designate weights S1 to S17 according the present invention and weight structures S20 to S22 containing information related to the weights.

The structures S20 360, S21 361, and S22 362 have been additionally disposed as a result of creation of the transition tNew 260 in FIG. 2.

FIG. 3C is a diagram for explaining data kept in the weight structures. Reference numerals 341a to 341d respectively indicates the number of uses of a function sequence kept in the weight structure S1 341, a usage frequency thereof computed from the value 341a, a function sequence pre_func activated as a result of fire of a preceding transition, and a function sequence next_func activated as a result of fire of a present transition. Similarly, reference numerals 342a to 342d, 343a to 343d, 353a to 353d, 360a to 360d, 361a to 361d, and 362a to 362d respectively designate numbers of uses, usage frequencies, symbols of pre_func, and symbols of next_func respectively kept in the weight structures S2 342, S3 343, S13 353, S20 360, S21 361, and S22 362.

The usage frequencies 341b, 342b, and 343b respectively of the weight structures S1 341, S2 342, and S3 343 related to the same preceding transition are respectively obtained by dividing the numbers of uses respectively thereof by the total of the numbers of uses 341a, 342a, 343a. The other usage frequencies are similarly calculated. A method of updating the number of usages will be later described in detail by reference to FIG. 6.

For the added structure S20 360, function series pre_func 360c and next_func 360d are decided by setting the gen-erated transition tNew 260 to the present transition 338 and the transition tea 225 firable therebefore to the preceding transition 325. Moreover, for the added structure S21 361, function series pre_func 361c and next_func 361d are decided by setting the transition tNew 200 to the preceding transition and the transition tea 225 firable thereafter to the present transition 335. Furthermore, for the added structure S22 362, function series pre_func 362c and next_func 362d are decided by setting the transition tNew 200 to the preceding transition and the transition tee 226 firable thereafter to the present transition 336. Specifically, the sequences of functions 360d, 361c, and 362c are produced as follows. The function sequence 343c, i.e., "[B]1,1" is coupled with the function sequence 343d, i.e., "[E]1,1" by a symbol "•" and then the entire input and output specification "1,1" is explicitly described.

With provision of a frame, i.e., a regular expression capable of describing in a unified manner a case where an identical function is successively activated and a case where a plurality of functions are sequentially activated, the functions can be easily activated in an arbitrary order.

Description will now be given in detail, by reference to flowcharts, of processing operations conducted by the user adaptive system and the user adaptive method according to the present invention.

FIG. 4 is a flowchart showing a processing procedure in an embodiment according to the present invention.

First, to implement the user adaptive system and method according to the present invention, the user initiates the function combining program stored in the storage area 132, thereby invoking the application program loaded in the storage area 131 shown in FIG. 1 (step 410). Next, a check is made to determine whether or not the user is beforehand registered to the system (step 420). If this is not the case, a weight structure is initialized in the storage area 133 (step 430); otherwise, a weight structure associated with the user is read from the storage area 143 to be loaded in the area 133 (step 440).

The user then specifies at least one of the objects 111 to 116 presented on the display 110 via the mouse 120 or the keyboard 150 and then selects one of the function selective menus 160 to 165 displayed on the display 110 via the mouse 120 or the keyboard 150 (step 450). In response thereto, the function combining program of the present invention accomplishes a control processing of the specified object and the selected function (step 460). The control processing of the function and the object will be described in detail later by reference to FIG. 5. When the user inputs a termination request of the application program (step 470), the weight structures existing in the storage area 133 are written into the area 143 (step 480), thereby terminating the processing. When the application program is not desired to be finished, the user repeatedly conducts the specification of any one of the objects 111 to 116 and the selection of a desired one of the selective menus 160 to 165 from the mouse 120 or the keyboard 150 (step 450).

Figure 5:
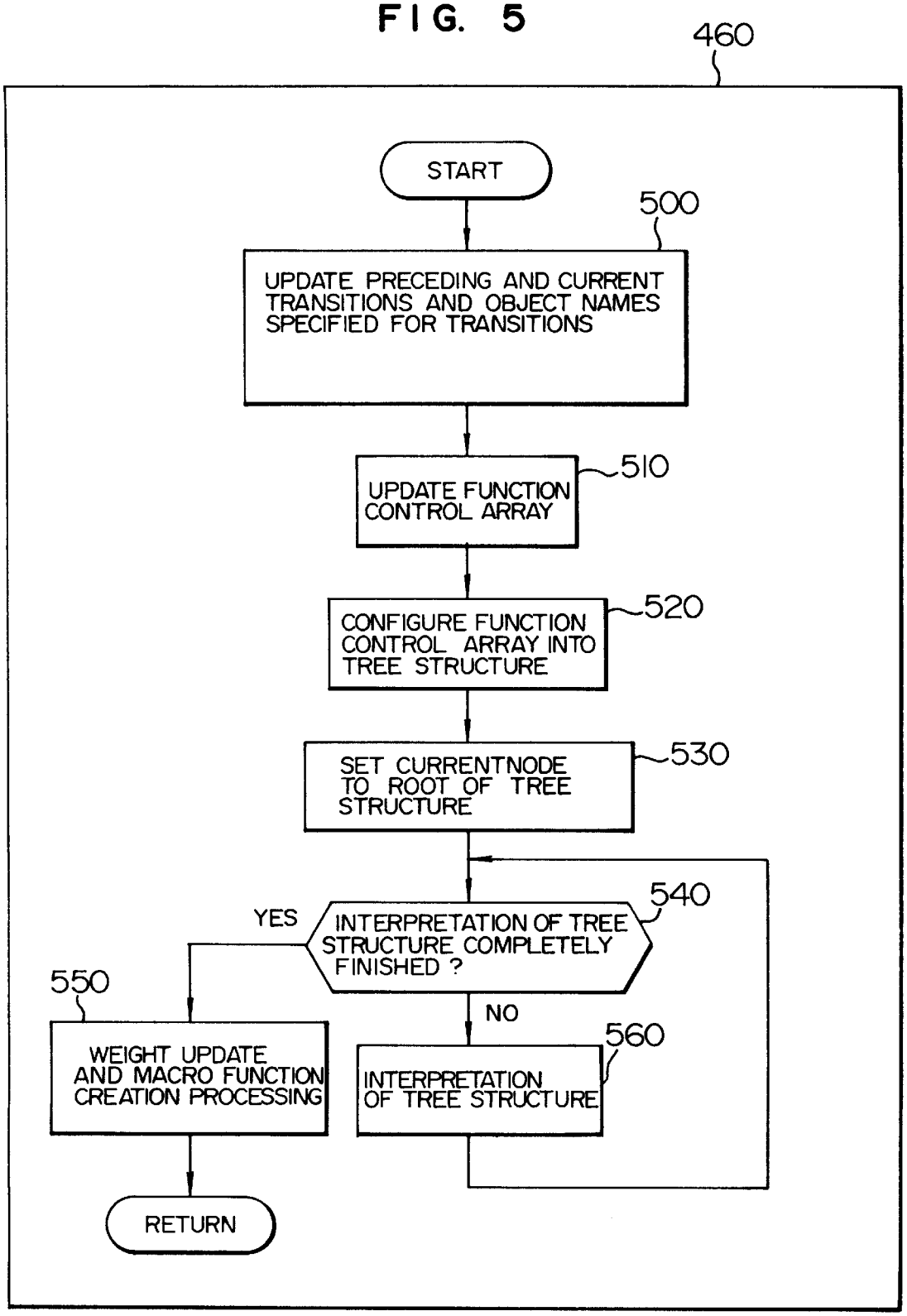
FIG. 5 is a flowchart showing a control processing of functions and objects in the processing procedure according to the present invention.

FIG. 5 is a flowchart showing the processing 460 to control functions and objects according to the present invention.

When the control processing 460 is started, according to each of the combinations of the objects specified by the user and the selective menus selected by the user, the system identifies a transition to be fired and then updates a preceding transition, a current transition, and object names associated therewith which are temporarily stored in the storage area 135 in advance (step 500).

Subsequently, based on the preceding and current transitions, a weight structure to be fired is identified and then the function control array 300 stored in the storage area 134 is updated according to a function sequence next_func to be activated as a result of fire of the current transition of the weight structure (step 510). For example, when the preceding and present transitions are respectively designated as tea 225 and ted 227, the function sequence next_func 353d invoked due to fire of the current transition of the weight structures S13 353 is read into the arrange 300.

The updated array 300 is configured into a tree structure for interpretation thereof (step 520). A method of constituting the tree structure of the array 300 will be described later by reference to FIGS. 7A to 7D.

Prior to starting interpretation of the tree structure, the system sets a current node to a root of the tree structure (step 530). If the tree structure is completely interpreted (step 540), a weight update and macro function generation processing is carried out (step 550), thereby terminating the function and object control processing. Otherwise, the interpretation of the tree structure is continuously accomplished (step 560).

Figure 6:
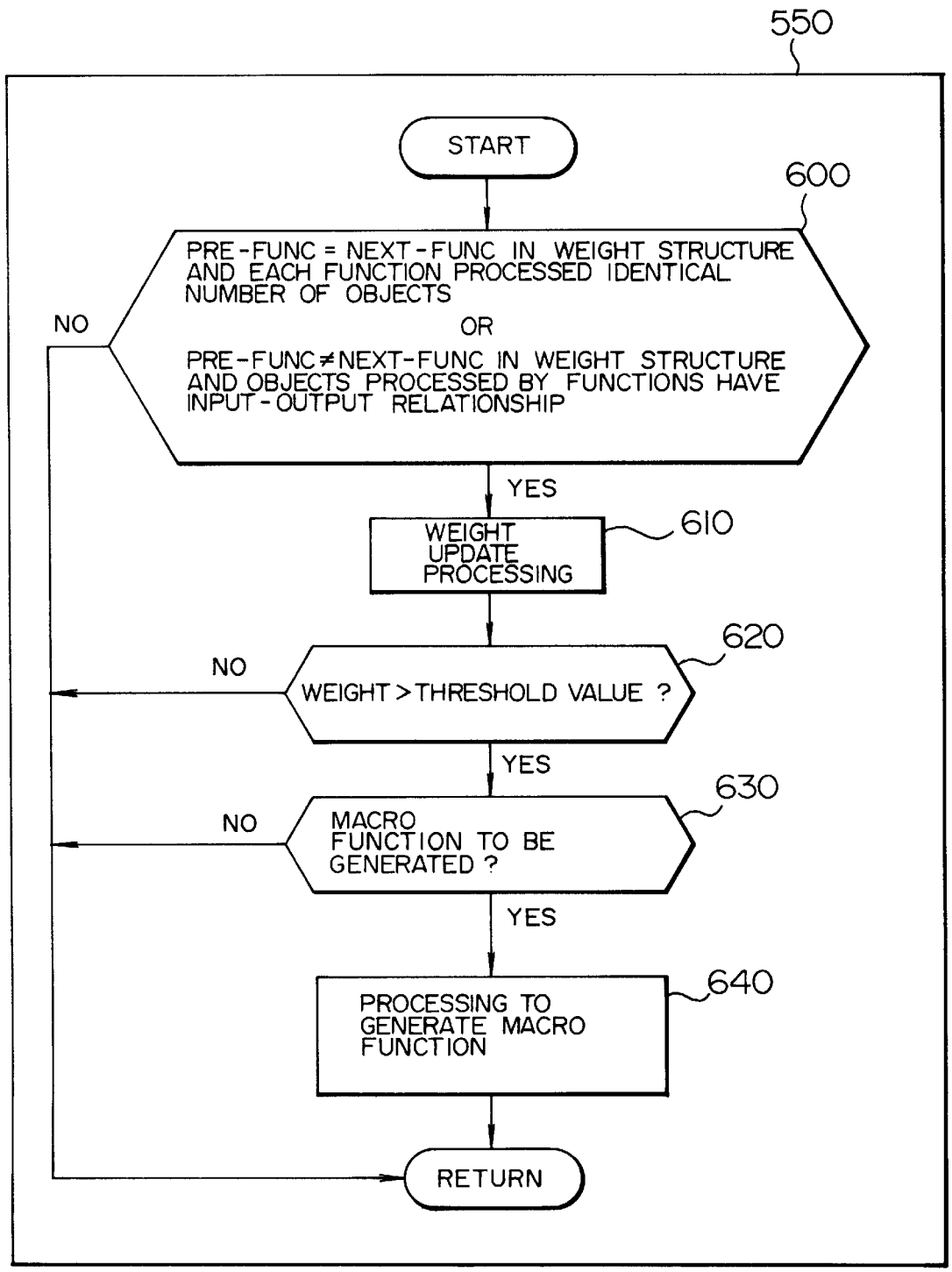
FIG. 6 is a flowchart showing a weight update and macro function creation processing in the processing procedure according to the present invention.

FIG. 6 is a flowchart showing a processing procedure of the weight update and macro function generation 550.

When the processing 550 is initiated, in a weight structure identified for the update according to the preceding and current transitions, when pre_func is equal to next_funct and each of the respective function sequences processes an identical number of objects or when pre_func is unequal to next_funct and the objects processed respectively by the function sequences have an input-output relationship therebetween (step 600), the number of uses of the weight structure is updated and the usage frequency, namely, the weight of the Petri net is computed again (step 610). When the attained weight exceeds a predetermined threshold value (step 620), a message of generation of a macro function creation is presented on the display 110 to request the user for the generation (step 630). When the user admits the request, there is achieved an operation to generate a macro function creation (step 630); otherwise, the processing 550 is terminated.

In the step 640, as described in conjunction with FIGS. 2 and 3, the system copies a place associated with pre_func of a weight structure having the identical weight, namely, the same usage frequency, thereby generating a new transition and arcs establishing connections therebetween. Furthermore, in association with the creation of the transition, a weight structure is added to the existing weight structure. In this operation, the new transition is set as a preceding transition; moreover, the new transition is set as the current transition. In the weight structure, pre_func and next_func are produced from pre_func and next_func belonging to a weight structure of the weight exceeding the threshold value.

However, when the combined function has 1-input and 1-output, in order for the function to be activated even for n-inputs and n-outputs, the numbers respectively of inputs and outputs are varied so as to thereby add places, transitions, arcs, and weight structures.

The step 600 corresponds to a case where different functions are sequentially effected for a fixed object and a case where a fixed function is achieved for various functions. The usage frequency, i.e., the weight is not updated for all function sequences executed without particular restrictions. That is, under these conditions, there can be achieved combination of function sequences much more preferable for the user.

FIGS. 7A to 7D are diagrams for explaining a tree structure to control functions employed according to the present invention.

Figure 7A:
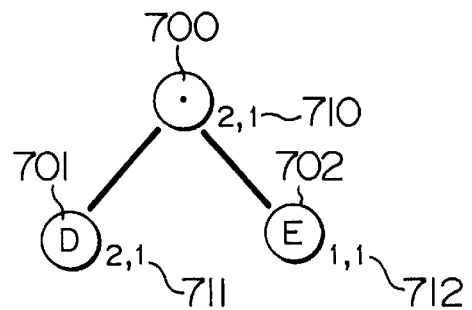
FIGS. 7A to 7E are diagrams useful to explain a tree structure to control functions employed according to the present invention.

FIG. 7A shows a tree structure for the function control array 300 of FIG. 3A. The diagram of FIG. 7A includes a root node 700, nodes 701 and 702, and numbers respectively of inputs and outputs 710 to 712.

The root node 700 corresponds to the symbol "." 308 and denotes that the child nodes 701 and 702 are sequentially executed. The input/output count 710 is associated with the symbols "2" 316, "," 317, and "1" 318 and designates that the child nodes 701 and 702 are consecutively executed in a 2-input 1-output operation. The node 701 and the associated input/output count 711 correspond to the symbols "[" 302, "D" 303, "]" 304, "2" 305, "," 306, and "1" 307 and express that the function D is treated in a 2-input 1-output operation. The node 702 and the related input/output count 712 correspond to the symbols "[" 309, "E" 310, "]" 311, "1" 312, "," 313, and "1" 314 and indicate that the function E is processed in a 1-input 1-output operation.

Figure 7B:
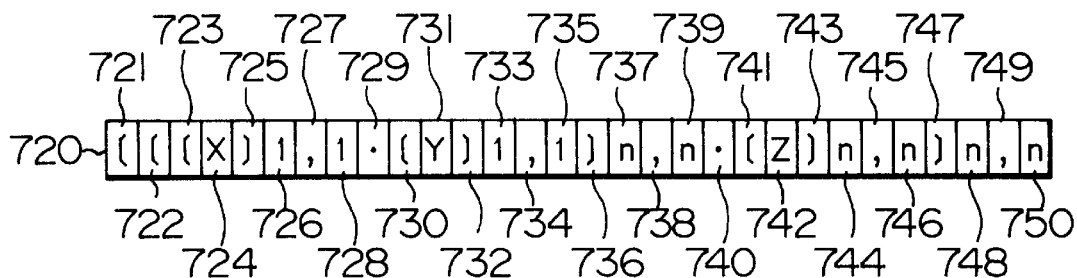

The diagram of FIG. 7B includes a function control array 720 and function control symbols 721 to 750.

Figure 7C:
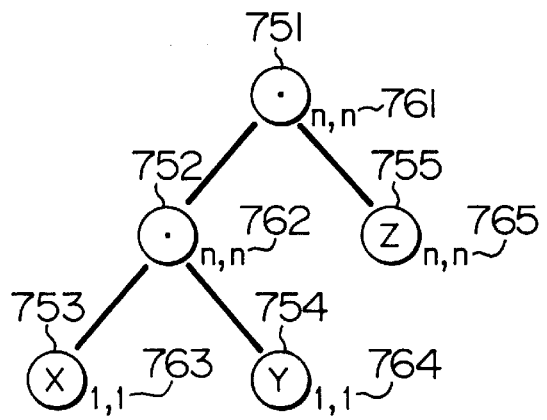

FIG. 7C shows a tree structure associated with the array 720 of FIG. 7B. The diagram of FIG. 7B includes a root node 751, nodes 752 to 755, and input/output counts 761 to 765.

The root node 751 corresponds to the symbol "." 740 and denotes that the child nodes 752 and 755 are sequentially executed. The input/output count 761 related to the node 751 is associated with the symbols "n" 748, "," 749, and "n" and represents that the function corresponding to the node 751 is treated in an n-input n-output operation. The node 752 corresponds to the symbol "." 729 and is employed together with the input count 762 associated with the node 752 to designates that functions represented by the child nodes 753 and 754 are executed in an n-input n-output operation. The node 753 and the associated input/output count 763 correspond to the symbols "[" 723, "X" 724, "]" 725, "1" 726, "," 727, and "1" 728 and indicate that the function X is handled in a 1-input 1-output operation. The node 754 and the associated input/output count 764 correspond to the symbols "[" 730, "Y" 731, "]" 732, "1" 733, "," 734, and "1" 735 and indicate that the function Y is treated in a 1-input 1-output operation.

Description will now be given of behavior of the nodes 752 to 754. These nodes are associated with the symbols 722 to 739 and indicate that two 1-input 1-output functions are sequentially activated for an object kept unchanged in an n-input n-output operation. When viewed from the user side, this implies that a plurality of objects are specified by the user for a combined function generated as a 1-input 1-output function. Until the objects specified by the user are completely processed, the system repeatedly activates the combined function while sequentially changing the object as an input thereto within the specified range of objects. Namely, the system sequentially initiates the 1-input 1-output functions X and Y as many as there are objects specified by the user, thereby processing the objects. Concretely, one of the objects specified by the user is fixed so as to sequentially actinate the functions X and Y. Next, the object is replaced by a subsequent object to sequentially initiate the functions X and Y. The processing is repeatedly executed for all objects specified by the user.

On the other hand, as for the behavior of the root node 751 and the node 755, since the n-input n-output function Z is treated in an n-input n-output operation, the object need not be altered. Namely, the plural objects specified by the user can be inputted as a batch to the function Z.

In summary, when the input/output count of a child node is larger than that of the parent node, the function associated with the child node is repeatedly initiated as many as there are inputs and outputs denoted by the input/output count of the parent node while sequentially varying the object within the range of objects specified by the user. In general, the function corresponding to the child node on the left is activated n times, where n is obtained by dividing the number of inputs of the parent node by the number of inputs of the child node on the left. The function associated with the child node on the right is initiated m times, where m is attained by dividing the number of outputs of the parent node by the number of outputs of the child node on the right.

Figure 7D:
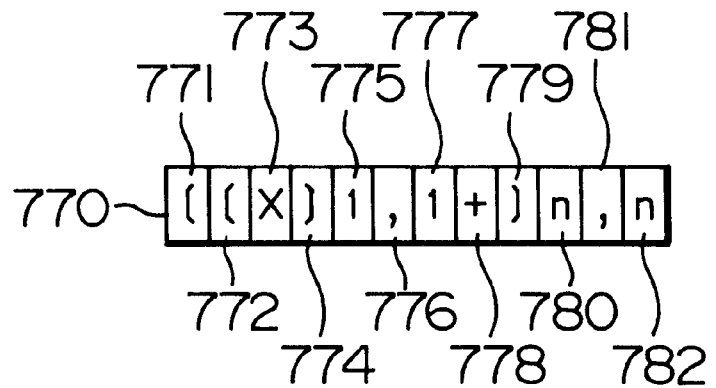

In the diagram of FIG. 7D, a numeral 770 stands for a function control array and numerals 771 to 782 designate function control symbols.

Figure 7E:
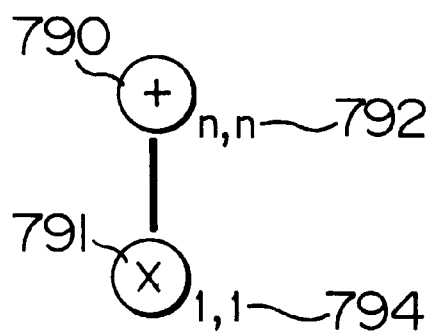

FIG. 7E shows a tree structure corresponding to the array 770 of FIG. 7D. This diagram includes a root node 790, a node 791, and input/output counts 792 and 794.

The root node 790 corresponds to the plus symbol "+" and denotes that the child node 791 is successively executed while changing the object as an input thereto for each execution.

Figure 8:
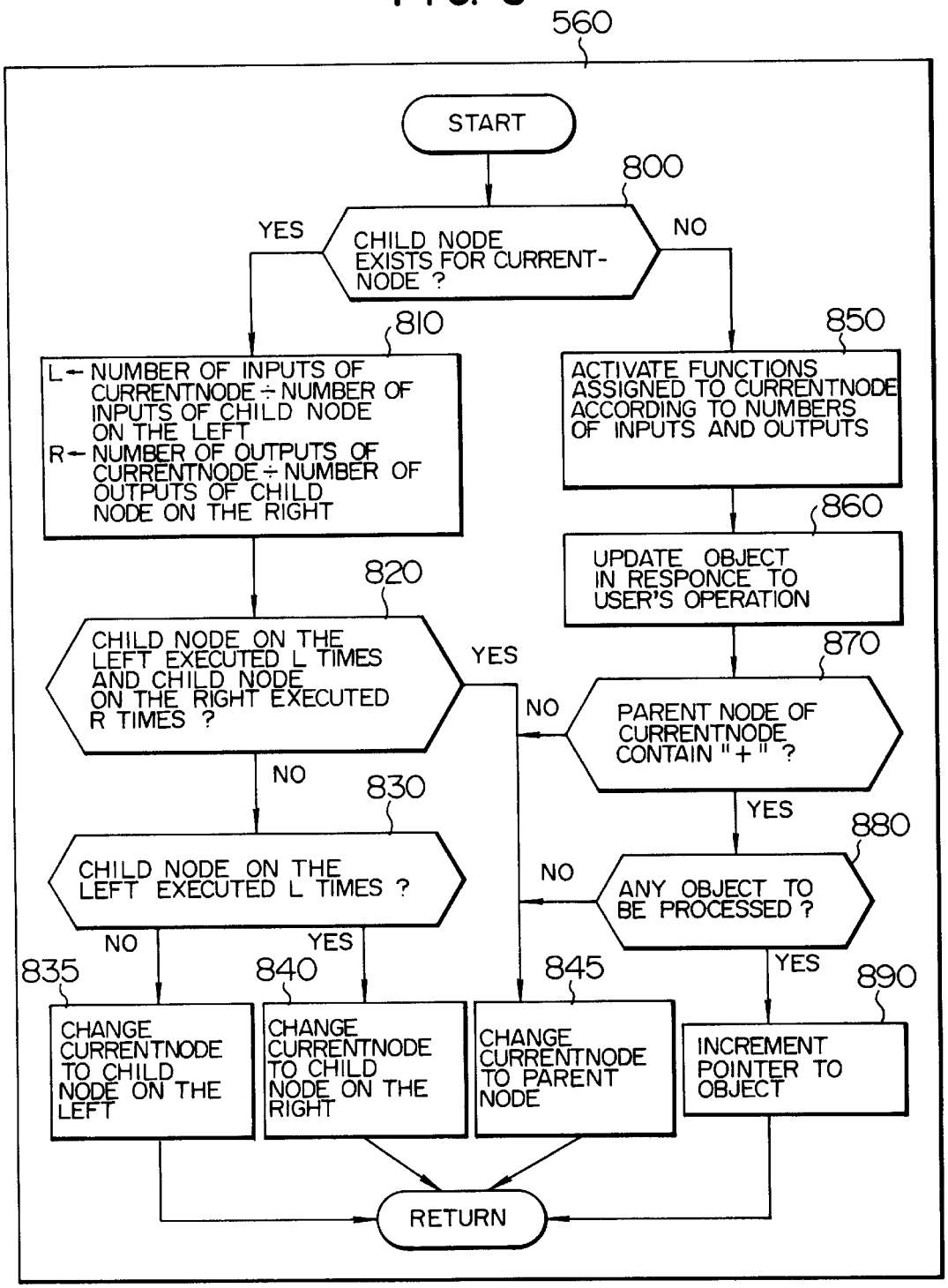
FIG. 8 is a flowchart showing the operation to interpret a tree structure adopted to control functions according to the present invention.

FIG. 8 is a flowchart showing the operation to interpret the function control tree structure employed according to the present invention.

When the processing of tree structure interpretation 560 is commenced, a check is carried out to decide whether or not a child node exists for CurrentNode (step 800). If there exists such a child node, the number of executions is determined for the node on the left (step 810). Concretely, the node execute count L is calculated by dividing the input count of CurrentNode by the input count of the child node on the left. The node execute count R is calculated by dividing the output count of CurrentNode by the output count of the child node on the right.

Next, a check is conducted to decide whether or not the child node on the left has been executed L times and whether or not the child node on the right has been executed R times (step 820). If this is not the case, a check is first achieved to determine whether or not the child node on the left has been executed L times (step 830). If the processing has not been carried out, CurrentNode is replaced by the child node on the left (step 835). If the node has been executed L times, CurrentNode is replaced by the child node on the right (step 840), thereby finishing the processing of interpreting tree structure. However, when the values of execution counts L and R calculated in the step 820 are equal to each other, the steps 835 and 840 are alternately accomplished.

When the child nodes are completely executed in the step 820, CurrentNode is substituted for the parent node (step 845), thereby finishing the operation of interpreting tree structure.

In the step 800, when CurrentNode does not have any child node, the function assigned to CurrentNode is activated for an input of an object specified by the user according to the input/output count thereof (step 850). The system updates the object according to the operation (step 860).

After the initiated function is terminated, a check is made to determine whether or not the plus symbol "+" is added to the parent node (step 870). If the symbol is present, a check is carried out to decide whether or not any unprocessed object exists as an input for successive execution of the function on the display 110 (step 880). If this is the case, the object is set as an input to the function (step 890) and then the tree structure interpretation is ended.

When the plus symbol "+" is missing in the root node of CurrentNode in the step 870 or when the unprocessed object is missing in the step 880, CurrentNode is changed to the parent node (step 845) so as to finish the tree structure interpretation.

The user adaptive system method according to the present invention will now be specifically described by reference to a motion picture editing system as an example of the existing application software system.

The motion picture editing is generally carried out by the following functions.

1. Preview function

First, to obtain information about the contents of raw pictures produced by a camera or acquired from another device, it is necessary to preview the pictures.

2. Cut separation function

The raw pictures to be edited are not necessarily recorded according to a sequence of story. Particularly, in a video tape prepared by an "amateur", there is not achieved a top-down fractionalizing operation including preparation of a senario, a story text, and so on which are used by experts. Namely, the pictures are shot and recorded at random on the tape in many cases. Moreover, even in a video tape created an expert, there exists unnecessary redundant portions. Consequently, in general, in the first step of tape editing operation, the pictures are subdivided into groups of pictures, i.e., into cuts or scenes each having a certain significant meaning. In the following description, the minimum unit of moving pictures is called a cut and a set including a plurality of cuts and having a high-order meaning is called a scene in this description.

3. Attribute adding function and selection of cut

Since there may exist unnecessary cuts, it is required to discard or to retain cuts. Alternatively, it is necessary to add attribute text information such as a name, a shooting date, a keyword for retrieval, and an OK/NG sign to each cut so as to clarify necessity or unnecessity thereof.

4. Trimming function

A trimming function is used to change, for a desired frame, a start (in) point and an end (out) point of a cut thereof to adjust a playback or reproduction period of time of the cut. Particularly, in a case where a total time of a plurality of cuts linked with each other differs from a desired period of time, the trimming is required to adjust the time. In this description, a frame indicates each of 30 still pictures which are successively displayed in one second to present a motion picture.

5. Keyframe change function

In an operation to display a cut in the face of an icon, when the cut is symbolically presented such that the cut can be discriminated from the other cut in a frame, the contents thereof can be recognized at once. This consequently facilitates subsequent operations. The keyframe change function is disposed to change an image presented according to a default value in the case above into an appropriate image favorably and explicitly representing the cut. This operation is meaningless when the editing is carried out only by a conventional video deck. However, when a computer is employed as an interface machine such that a cut is presented in the face of an icon to be directly manipulated in the editing operation, it is quite important for the user to immediately recognize the contents associated with the icon, namely, the contents of the pertinent cut.

6. Ordering function

This function is employed, after the unnecessary cuts are removed as a result of, for example, the trimming, to order the resultant cuts according to the story.

7. Special effect functions

To efficiently conduct turn between two cuts, there is achieved special effect processing such as fading, wiping, dissolving, and overlapping operations. When these operations are effectively used, the story can be smoothly developed.

In this connection, the fading function is adopted for a gradual turn from a white/black background to a cut or vice versa while altering a mixture ratio therebetween. The wiping function is employed for a turn from a cut to another cut according to a wipe pattern. The dissolving operation is disposed for a gradual turn from a cut to another cut by changing a mixture ratio therebetween. The overlapping function is used to combine two cuts with each other in which a particular color is removed from one of the cuts to form a combined image with the other one thereof set as the background.

The functions 1 to 7 however need not be utilized in this order. Namely, according to preference of the user conducting the editing operation, the functions above are employed in an arbitrary sequence. Depending on cases, after conducting the cut separation and the trimming for raw motion pictures not undergone an editing operation, the user may achieves a subsequent function. Alternatively, it may also be possible to conduct operation as follows, namely, when the cut separation is achieved for the raw pictures, the trimming function is executed for an obtained cut immediately thereafter. Furthermore, after the ordering function is conducted on a video tape, if the resultant overall story requires a long-period job, it will be necessary in some cases to achieve the trimming function for the respective cuts thereof again.

FIG. 9 shows an example of a display screen in an embodiment in which the operation sequence user adaptive method and system of the present invention are applied to a motion picture editing operation. Specifically, objects and selective menus of functions for the motion picture editing are presented on the display 110.

In FIG. 9, reference numerals 901 to 904 denote existing function selective menus to activate the cut separation, keyframe change, trimming, and dissolving functions, respectively. Numerals 905 to 907 are related to functions added to the system according to the user adaptive system and method of the present invention and respectively designate an combined function selective menu to sequentially initiate the dissolving function and the keyframe change function, an combined function selective menu to sequentially initiate the keyframe change function and the trimming function, and an combined function selective menu to sequentially initiate the trimming function while altering the object of the function. Numerals 910 to 917 respectively denote cuts as objects of functions. A numeral 920 designates a scene generated as a result of the dissolving function effected for the cuts 910 and 915. When a selection is made for the function selective menus 901 to 907, there is opened a window to manipulate an object specified at the selection such that the user manipulates the object in the window.

FIGS. 10A to 10F are diagrams for explaining function sequences adapted to the user in an embodiment in which the operation sequence user adaptive method and system of the present invention are applied to a motion picture editing operation.

Figure 10A:
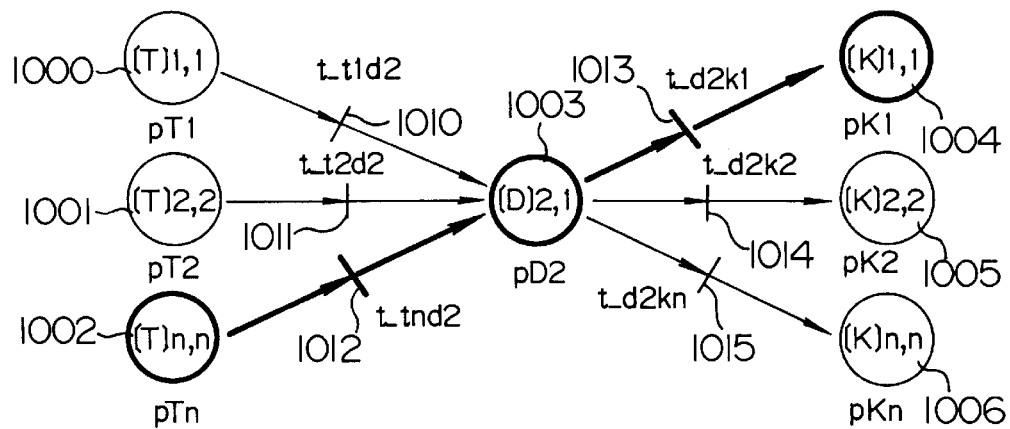
FIGS. 10A to 10F are diagrams for explaining function sequences adapted for the user in an embodiment in which the user adaptive system and the user adaptive method are applied to a motion picture editing operation according to the present invention.
Figure 10B:
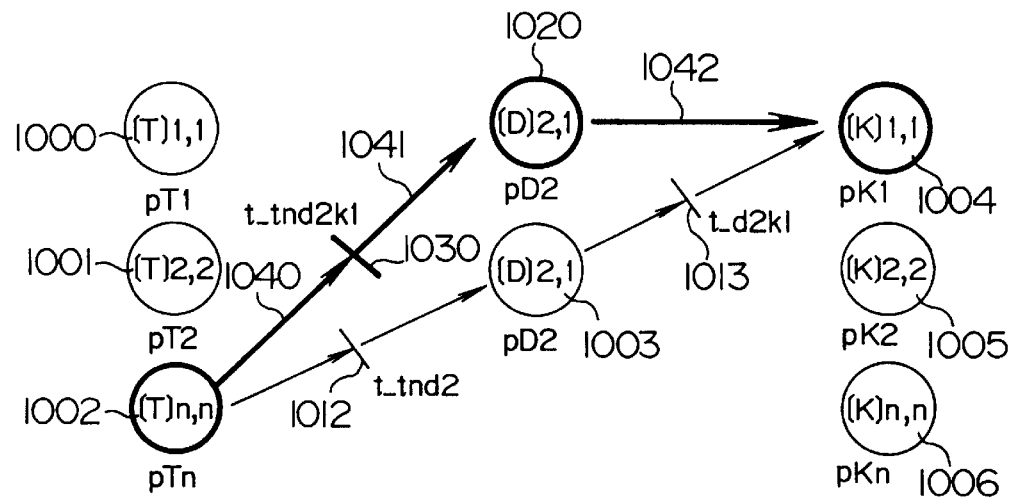

FIGS. 10A and 10B show examples in which the number of objects to be processed is varied due to combination of a function sequence.

In FIG. 10A, reference numerals 1000 to 1002 respectively denote places pT1, pT2, and pTn to treat the trimming function in a 1-input 1-output operation, a 2-input 2-output operation, and an n-input n-output operation, respectively. A numeral 1003 indicates a place pD2 to conduct the dissolving function in a 2-input 1-output operation. Numerals 1004 to 1006 respectively stand for places pK1, pK2, and pKn to process the keyframe change function in a 1-input 1-output operation, a 2-input 2-output operation, and an n-input n-output operation, respectively. Numerals 1010 to 1012 respectively designate transitions t_t1d2, t_t2d2, and t_tnd2 to activate the dissolving function in a 2-input 1-output operation. Numerals 1013 to 1015 respectively indicate transitions t_d2k1, t_d2k2, and t_d2kn to handle the keyframe change function in a 1-input 1-output operation, a 2-input 2-output operation, and an n-input n-output operation, respectively.

In this regard, there have been prepared 1-input, 2-input, and n-input places and transitions, arcs for connections therebetween, and weight structures. Provisions for two objects have been disposed in consideration of operation in which the dissolving function D supervising the special effect functions is executed in a 2-input 1-output operation.

In FIG. 10B, a numeral 1020 denotes a place pD2' created to sequentially initiate the dissolving function and the keyframe change function, a numeral 1030 stands for a transition t_tnd2k1 to activate in a 2-input 1-output operation the resultant combined function of the dissolving function and the keyframe change function, and arcs 1040 to 1042 to establish connections therebetween. Omitted in this diagram are the transition t_t1d2 1010, the other arcs, etc.

Assume that processing of the trimming function is finished in the following case. The user specifies a plurality of objects chosen from the objects 910 to 915, selects the selective menu for the trimming function, and then activates the function.

When the user specifies the cuts 910 and 915 as objects and selects the menu 904 for the dissolving function, the transition t_tnd2 1012 is fired. Accordingly, using the cuts 910 and 915 as inputs thereto, the 2-input 1-output dissolving function [D]2,1 is initiated and then a window dedicated thereto is opened.

When the user finishes manipulation of the cuts 910 and 915 in the window, the dedicated window is closed and then the scene 920 is displayed as a new object.

When the user specifies the outputted scene 920 and selects the menu 902 for the keyframe change function, the transition t_t2k1 1013 is fired. Resultantly, the 1-input 1-output keyframe change function [K]1,1 is initiated and then a window dedicated thereto is opened.

When the user completes manipulation of the scene 920 in the dedicated window, the window is closed and then the updated scene 920 is displayed.

In this situation, according to the embodiment above, a weight structure to be updated is identified according to the preceding transition t_tnd2 1012 and the current transition t_d2k1 1013 so as to update the weight thereof.

In a case where the weight exceeds a preset threshold value, there are produced the place pD2' 1020, the transition t_tnd2k1 1030, and the arcs 1040 to 1042 to establish connections therebetween. In association with this operation, there are added a weight structure having the transition t_tnd2k1 1030 as the preceding transition and a weight structure having the transition t_tnd2k1 1030 as the current transition. Moreover, the function selective menu 905 to select the resultant combined function of the dissolving function and the keyframe change function is additionally presented on the display screen 110.

Thanks to the creation of the combined function, the operation in which two cuts are specified to activate the dissolving function and then the scene displayed as a result is specified to initiate the keyframe change function can be achieved only by selecting the combined function with the two cuts thus specified. This accordingly improves usability of the system for the user.

Figure 10C:
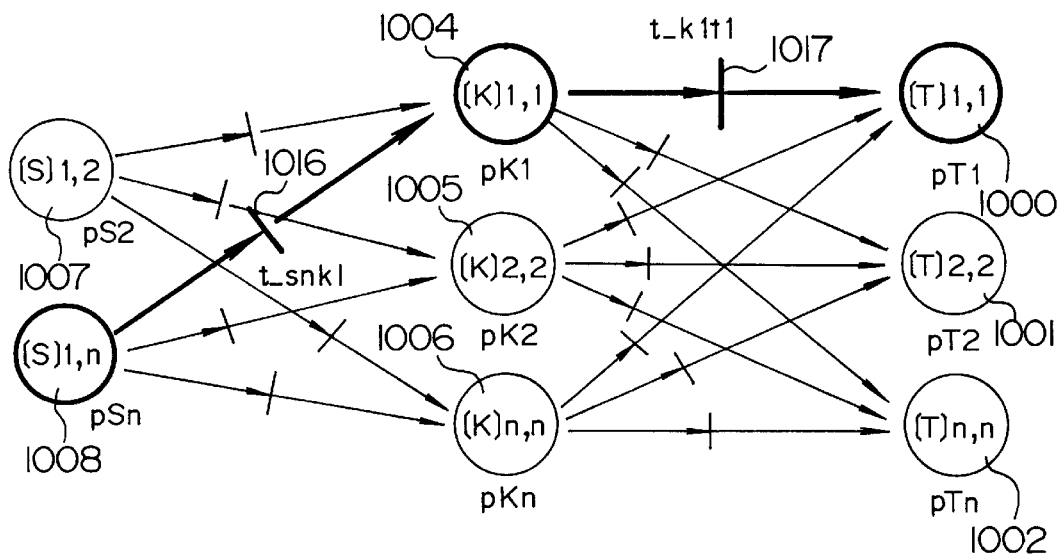

FIG. 10C shows an example of creation of a 1-input 1-output combined function.

In FIG. 10C, numerals 1007 and 1008 respectively indicate places ps2 and pSn to treat the cut separation in a 1-input 2-output operation and a 1-input n-output operation, respectively. A numeral 1016 denotes a transition t_snk1 to initiate the keyframe change function in a 1-input 1-output operation. A numeral 1017 stands for a transition t_k1t1 to activate the trimming function in a 1-input 1-output operation.

Figure 10D:
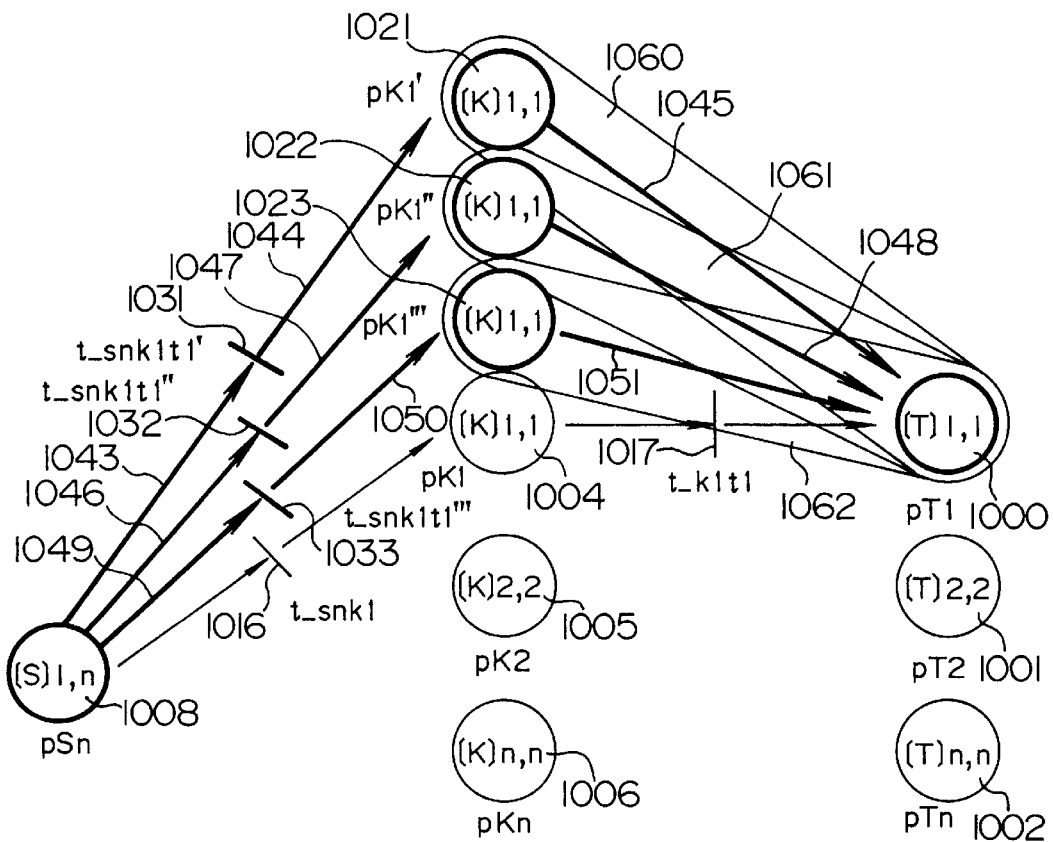

In FIG. 10D, numerals 1021 to 1023 respectively designate places pK1', pK1", and pK1'" created to sequentially initiate the keyframe change function and the trimming function. Numerals 1031 to 1033 respectively indicates transitions t_snk1t1', t_snk1t1", t_snk1t1'" to activate the resultant combined function of the keyframe change function and the trimming function in an 1-input 1-output operation, a 2-input 2-output operation, and n-input n-output operation, respectively. Numerals 1043 to 1051 are arcs to establish connections therebetween. Numerals 1060 to 1062 denote elliptic places to respectively treat in a collective manner a combination of the places pk1' 1021 and pT1 1000, a combination of the places pk1" 1022 and pT1 1000, and a combination of the places pk1'" 1023 and pT1 1000, respectively.

Assume that the user specifies one of the objects 910 to 915 shown in FIG. 9, selects the selective menus 901 for the cut separation function, and then initiates the function, thereby subdividing the cut into a plurality of cuts.

When the user specifies the cut 913 as an object and selects the menu 902 for the keyframe change function, the transition t_snk1 1016 is fired. Accordingly, using the cut 913 as an input thereto, the 1-input 1-output keyframe function [K]1,1 is initiated and then a window dedicated thereto is opened.

When the user finishes manipulation of the cut 913 in the window, the dedicated window is closed and then the cut 913 obtained by changing the keyframe 913 is displayed.

When the user specifies the resultant cut 913 and then selects the menu 903 for the trimming function, the transition t_k1t1 1017 is fired. As a result, the 1-input 1-output trimming function [T]1,1 is activated to open a window dedicated thereto.

When the user completes manipulation of the cut 913 in the window, the dedicated window is closed and there is displayed the cut 913 in which in and out points are thus altered.

In the embodiment, a weight structure to be updated is identified according to the preceding transition t_snk1 1016 and the current transition t_k1t1 1017, thereby updating the weight of the structure.

When the weight exceeds a preset threshold value, there are produced places pk1' 1021, pk1" 1022, pk1" 1023, transitions t_snk1t1' 1031, t_snk1t1" 1032, and t_snk1t1'" 1033, and arcs 1043 to 1051 to establish connections therebetween.

Moreover, elliptic places 1060 to 1062 are generated such that when the token sequentially passes the places pK1' 1021 and pT1 1000, the function [T]1,1 not activated after the plural cuts are completely processed by [K]1,1. Namely, for each specified cut, [K]1,1 and [T]1,1 are sequentially activated.

In association with the creation of places, transitions, and arcs above, there are added weight structures respectively having as preceding transitions thereof the transitions t_snk1t1' 1031, t_snk1t1" 1032, t_snk1t1'" 1033 and weight structures having as current transitions thereof the transitions t_snk1t1' 1031, t_snk1t1" 1032, and t_snk1t1'" 1033. Furthermore, there is added in the display screen 110 the resultant function selective menu 906 to select the combined function of the keyframe change function and the trimming function.

Thanks to the production of the combined function, the operation in which a cut is specified to activate the keyframe change function and then the cut or cuts displayed as a result is or are specified to initiate the trimming function can be achieved only by selecting the combined function. This resultantly improves usability of the system for the user.

Figure 10E:
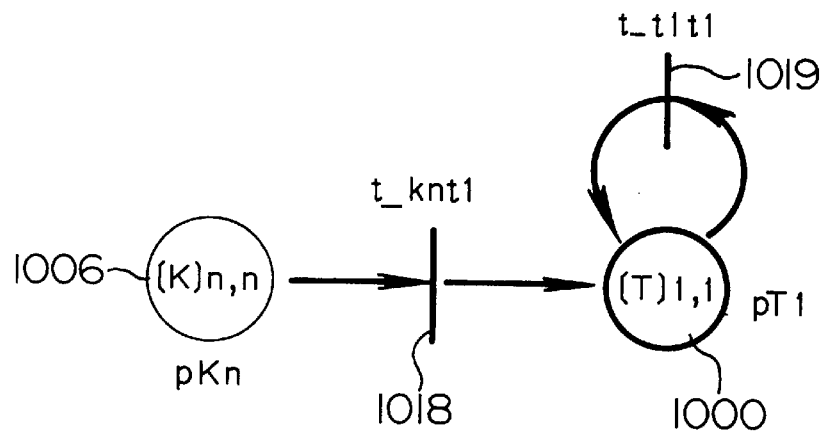
Figure 10F:
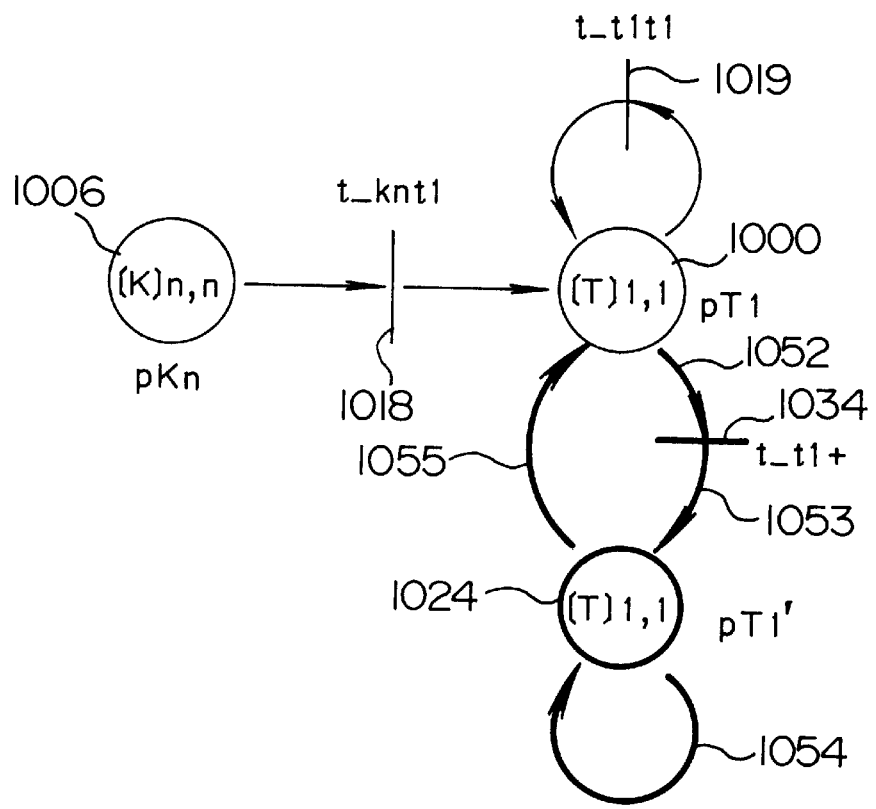

FIGS. 10E and 10F collectively show an example of the combined function in which an identical function is successively initiated each time an object thereof is changed for the processing thereof.

In FIG. 10E, numerals 1018 and 1019 respectively denote transitions t_knt1 and t_t1t1 to activate the trimming function in a 1-input 1-output operation.

In FIG. 10F, a numeral 1024 indicates a place pT1' generated to successively activate the trimming function while changing the object thereof in a 1-input 1-output operation. A numeral 1034 stands for a transition t_t1+ to contiguously initiate the trimming function thus prepared. Numerals 1052 to 1055 designate arcs to establish linkages therebetween.

Assume that processing of the trimming function is finished as a result of operation in which the user specifies either one of the objects 910 to 915, selects the selective menu 903 for the trimming function, and then activates the function.

When the user specifies the cut 914 as an object and selects the menu 903 for the trimming function, the transition t_t1t1 1019 is started. Accordingly, using the cut 914 as an input thereto, the 1-input 1-output trimming function [T]1,1 is initiated and then a window dedicated thereto is opened.

When the user finishes manipulation of the cut 914 in the dedicated window, the window is closed and then there is presented the cut 914 in which the in and out points are changed.

When the user specifies the different cut 915 and selects the menu 903 for the trimming function, the transition t_t1t1 1019 is fired. Resultantly, with the cut 915 set as an input, the 1-input 1-output trimming function [T]1,1 is commenced and then a window dedicated thereto is opened.

When the user completes processing of the cut 915 in the dedicated window, the window is closed and then there is displayed the cut 915 containing the in and out points thus altered.

In the embodiment, a weight structure to be updated is identified according to the preceding transition t_t1t1 1019 and the current transition t_t1t1 1019 so as to update the weight thereof.

In a case where the weight exceeds a preset threshold value, there are produced a place pT1' 1024, a transition t_t1+ 1034, and arcs 1052 to 1055 for connections therebetween. In association therewith, there are added a weight structure having the transition t_t+1 1034 as the preceding transition and a weight structure having the transition t_t+1 1034 as the current transition. Moreover, the function selective menu 907 to select the resultant combined function to successively activate the trimming function is additionally presented on the display screen 110.

Thanks to the creation of the combined function, the operation in which one cut is specified to activate the trimming function and then another cut is specified to activate the trimming function can be achieved only by selecting the combined function while changing the specified object. This accordingly improves usability for the user.

Figure 11:
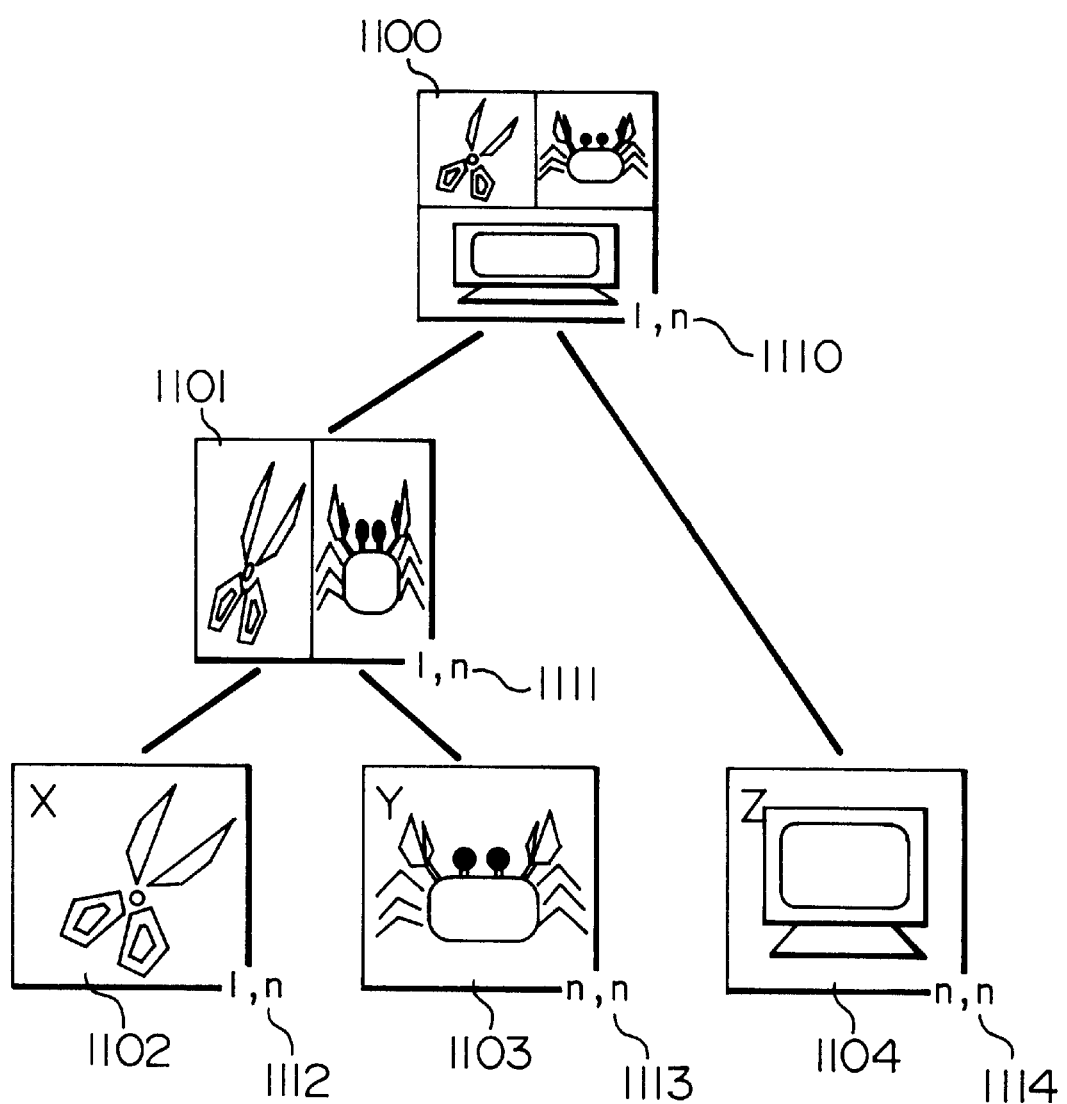
FIG. 11 is a diagram useful to explain selective menus of function sequences adapted to the user in an embodiment in which the user adaptive system and the user adaptive method are applied to a motion picture editing operation according to the present invention.

FIG. 11 is a diagram for explaining selective menus of user adaptive function sequences in an embodiment in which the user adaptive system and method are applied to a motion picture editing operation according to the present invention.

In FIG. 11, reference numerals 1100 to 1104 respectively indicate icons representing function selective menus, specifically, the icon 1100 for a function to sequentially initiate the cut separation, trimming, and preview functions, the icon 1101 for a function to sequentially initiate the cut separation and trimming functions, the icon 1102 for the cut separation function, the icon 1103 for the trimming, and the icon 1104 for the preview function. Numerals 1110 to 1114 respectively stand for input/output counts for the associated functions.

As above, the face of a selective menu to be additionally disposed in association with the combined function sequence is displayed, the face being composed of portions of the selective menus. This enables the user to easily recognize the meaning of the added selective menu at once.

In accordance with the embodiments described above, there are disposed a model including a function currently active in an application program at a token, a state from when a function in a place is initiated to when a subsequent function is activated, an activating condition to decide whether or not combinations of objects specified by the user for a transition and functions selected by the user are executable, an execution sequence of functions in a direction of arc, and a Petri net in which a utilization frequency of function sequence is assigned as a weight (assigned to two transitions to be successively fired). When the user is conducting an operation, the system monitors the operation to update the pertinent weight.

When the weight becomes to be greater than a predetermined threshold value, the place to which the pertinent function is assigned is copied and then there are generated arcs establishing connections therebetween and transitions, thereby producing an combined function sequence associated therewith. As a result, a sequence of function series significant to the user is extracted from the sequence of operations conducted by the user according to functions supported by the system, thereby improving usability for the user.

Moreover, when a combined function sequence is created from two or more function sequences, a selective menu related thereto is added to the existing function selective menus. This enables the user to execute a function unique to the user, thereby also improving usability.

Furthermore, the face of the selective menu to be additionally presented in association with the combined operation sequence includes portions of the existing function selective menus, which facilitates the user to immediately recognize the meaning of the added selective menu.

In addition, there is provided a frame, namely, a regular expression capable of describing in a unified fashion a case where an identical function is successively activated and a case where a plurality of functions are sequentially initiated, thereby easily activating the functions in an arbitrary order.

Moreover, there is disposed storage means for storing therein history including a combination of a function activated and objects for which the function is executed. Accordingly, the objective weight is updated, only in a case where a function previously initiated is equal to a currently active function and the number of objects for which the function previously initiated is executed is identical that of the objects for which the currently active function is executed or a case where the function previously initiated is unequal to the currently active function and the objects upon which the function previously acted and the objects upon which the current function acts are inputs and outputs of the previously activated function. As a result, only when a particular function sequence considered to reflect an operation purpose of the user is executed, the pertinent weight is updated. Consequently, it is possible to extract a function sequence preferably reflecting the operation purpose of the user.

In consequence, there are unnecessitated a considerably large amount of knowledge and plenty of human power conventionally required for the customizing job in the prior art. In short, while the user is operating a system in a desired manner, the system is automatically prepared to be adaptive to the user.

Furthermore, according to the embodiments, it is possible to provide a user adaptive system not only for particular applications but also for general applications in various fields.

While particular embodiments of the invention have been shown and described, it will be obvious to those skilled in the art that various changes and modifications may be made without departing from the present invention in its broader aspects.

We claim:

1. An operation sequence user adaptive system for use in a central processing unit (CPU) in which an application program is operated, wherein after objects displayed on a display screen of a display are specified from a mouse or a keyboard, and when a function to be effected for the objects are specified through selection of a function selective menu, a pertinent function of the application program is executed, the operation sequence user adaptive system comprising:

means for storing a data structure for storing therein a usage frequency of each of the functions;

update means for monitoring an operation conducted by the user for each of the functions and updating a weight of particular functions which are successively operated; and combining means, operative when the weight updated by the update means exceeds a predetermined threshold values for combining the particular functions associated with the weight.

2. A system according to claim 1, wherein said data structure stored in said storing means includes a weighted Petri net representing the function being currently active in the application program being operated in said CPU at a token, information indicating a state from when the function is activated in a plurality of places in which the token is arranged to when a next function is activated, information indicating an execution order of the functions in a direction of an arc establishing a connection therebetween, information indicating an activating condition to decide whether or not combinations of objects specified at a transition disposed for the arc and a selected function are executable, and information indicating a usage frequency of a function sequence by the weight assigned to the two transitions successively fired.

3. A system according to claim 1, wherein the central processing unit further includes a selective menu of the function associated with the combined particular functions independently of the existing function selective menus, and wherein the central processing unit displays, when setting a selective menu of a function associated with the combined particular functions independently of the existing function selective menus, a face of the selective menu, the face being formed of portions of the existing selective menus.

4. A system according to claim 1, wherein the central processing unit further includes a selective menu of the function associated with the combined particular functions independently of the existing function selective menus, and wherein a predetermined one-dimensional array controlling a consecutive activation of one of the functions or a sequential activation of plural functions selected therefrom is described according to a normalized expression in a unified fashion.

5. A system according to claim 1, wherein the objective weight is updated only when a function previously activated is equal to a function being currently active and the number of objects previously acted upon is identical to that of objects being currently acted upon or only when a function previously activated is different from a function being currently active and objects previously acted upon and objects being currently acted upon are inputs and outputs of the previously activated function.

6. An operation sequence user adaptive method for use in a processing system including a central processing unit in which after objects displayed on a display screen of a display are specified from a mouse or a keyboard, when a function to be effected for the objects are specified through selection of a function selective menu, a pertinent function of an application program is executed, the method comprising the following steps of:

preparing a data structure for storing therein a usage frequency of each of the functions;

monitoring an operation conducted by the user for each of the functions and updating a weight of particular functions which are successively operated; and combining, when the weight updated by the update means exceeds a predetermined threshold value, the particular functions associated with the weight.

7. A method according to claim 6, wherein said data structure stored in said storing means includes a weighted Petri net representing the function being currently active in an application program being operated in said CPU at a token, information indicating a state from when the function is activated in a plurality of places in which the token is arranged to when a next function is activated, information indicating an execution order of the functions in a direction of an arc establishing a connection therebetween, information indicating an activating condition to decide whether or not combinations of objects specified at a transition disposed for the arc and a selected function are executable, and information indicating a usage frequency of a function sequence by the weight assigned to the two transitions successively fired.

8. A method according to claim 6, wherein a selective menu of the function associated with the combined particular functions is included independently of the existing function selective menus.

9. A method according to claim 8, wherein when a selective menu of a function associated with the combined particular functions is set independently of the existing function selective menus, a face of the selective menu is displayed, the face being formed of portions of the existing selective menus.

10. A method according to claim 8, wherein a predetermined one-dimensional array controlling a consecutive activation of one of the functions or a sequential activation of plural functions selected therefrom is described according to a normalized expression in a uniform fashion.

11. A method according to claim 6, wherein the objective weight is updated only when a function previously activated is equal to a function being currently active and the number of objects previously acted upon is identical to that of objects being currently acted upon or only when a function previously activated is different from a function being currently active and objects previously acted upon and objects being currently acted upon are inputs and outputs of the previously activated function.

* * * * *